United States Patent

Ureshino et al.

[11] Patent Number: 5,803,355
[45] Date of Patent: Sep. 8, 1998

[54] CONTROL SYSTEM OF AUTOMOTIVE AIR CONDITIONING DEVICE

[75] Inventors: Hiroyuki Ureshino, Sano; Eiji Takahashi, Ashikaga, both of Japan; Kouji Iwahashi, Teteboro, N.J.; Takashi Matsumoto, Yokohama; Yoshinori Satoh, Yokosuka, both of Japan

[73] Assignees: Calsonic Corporation, Tokyo; Nissan Motor Co., Ltd., Yokohama, both of Japan

[21] Appl. No.: 733,935

[22] Filed: Oct. 18, 1996

[30] Foreign Application Priority Data

Oct. 19, 1995 [JP] Japan .................................. 7-271599

[51] Int. Cl.$^6$ .............................. G05D 23/00; B60H 1/00
[52] U.S. Cl. ................................ 236/13; 236/51; 454/75; 165/204
[58] Field of Search ............................... 236/13, 51, 49.3, 236/84; 165/43, 204, 42; 62/244, 186, 179; 454/75

[56] References Cited

U.S. PATENT DOCUMENTS

| | | | |
|---|---|---|---|
| 4,381,074 | 4/1983 | Iijima et al. | 236/13 |
| 4,640,183 | 2/1987 | Doi | 98/2.01 |
| 4,819,715 | 4/1989 | Kobaysshi | 165/16 |
| 4,922,171 | 5/1990 | Ohi | 165/43 X |
| 4,953,630 | 9/1990 | Iida | 164/43 X |
| 5,196,965 | 3/1993 | Lang et al. | 359/841 |
| 5,305,316 | 4/1994 | Yoshida et al. | 370/85.1 |
| 5,440,486 | 8/1995 | Rudzewicz et al. | 364/424 |

FOREIGN PATENT DOCUMENTS

0 193 485  9/1986  European Pat. Off. .
0 476 600  9/1991  European Pat. Off. .

Primary Examiner—Harry B. Tanner
Attorney, Agent, or Firm—Foley & Lardner

[57] ABSTRACT

A control system of automotive air conditioning device comprises a heater/cooler unit having therein a plurality of control doors by which various air flow modes are provided. A plurality of identical actuators are employed for actuating the control doors. Each actuator includes an electric motor for driving the corresponding control door, a position detector for issuing a current position signal representative of the current angular position assumed by the corresponding control door, and a control circuit for controlling the electric motor by processing both the current position signal as well as a target position signal applied thereto. A control unit is further employed for totally controlling the actuators by means of a multiplex communication carried out between the control unit and each of the actuators. The control unit issues the target position signal to each of the actuators.

6 Claims, 8 Drawing Sheets

FIG.5C  THRESHOLD FOR DATA SIGNAL
 THRESHOLD FOR CLOCK SIGNAL

| SOM | ADR | ENA | DATA | PRTY | POS |

CONTROL SYSTEM OF AUTOMOTIVE AIR CONDITIONING DEVICE

BACKGROUND OF THE INVENTION

1. Field of the Invention

The present invention relates in general to an automotive air conditioning device, and more particularly to a control system of the automotive air conditioning device, which is simple in construction.

2. Description of the Prior Art

In general, an automotive air conditioning device has in a heater/cooler unit thereof various control doors, for example, a mode door, an air mix door, an intake door and the like. These control doors are actuated by respective actuators controlled by a control unit. Usually, the actuator has an electric motor installed therein by which the corresponding control door is driven.

In order to clarify the task of the present invention, one conventional control system for controlling an automotive air conditioning device will be described with reference to FIG. 9 of the accompanying drawings.

In the drawing, denoted by numeral 1 is a mode door actuator by which a mode door is actuated, 2 is an air mix door actuator by which an air mix door is actuated and 3 is an intake door actuator by which an intake door is actuated. These actuators 1, 2 and 3 are totally controlled by a control unit 4. A control panel 5 having control switches and display devices mounted thereon is connected to the control unit 4.

The actuators 1, 2, and 3 are of a type having an electric motor 6 installed therein. Due to the individual work needed for detecting the angular position of the corresponding control door, the three actuators 1, 2, and 3 have different constructions. That is, the mode door actuator 1 has therein a position sensor 7 of a pattern type that is turned ON and OFF in accordance with the movement of an output shaft of the actuator to which the control door is linked. In the example of FIG. 9 wherein five air blowing modes are available, nine communication wires are used. The air mix door actuator 2 has therein a potentio-balance-resistor (PBR) 8, which is a variable resistor whose slider is moved in accordance with the movement of an output shaft of the actuator for outputting a voltage signal whose magnitude represents the current angular position of the air mix door. In the illustrated example, five communication wires are used. While, the intake door actuator 3 has therein a position sensor 9 of the pattern type. In the illustrated example wherein three air intake modes are available, seven communication wires are used.

Figure 9:
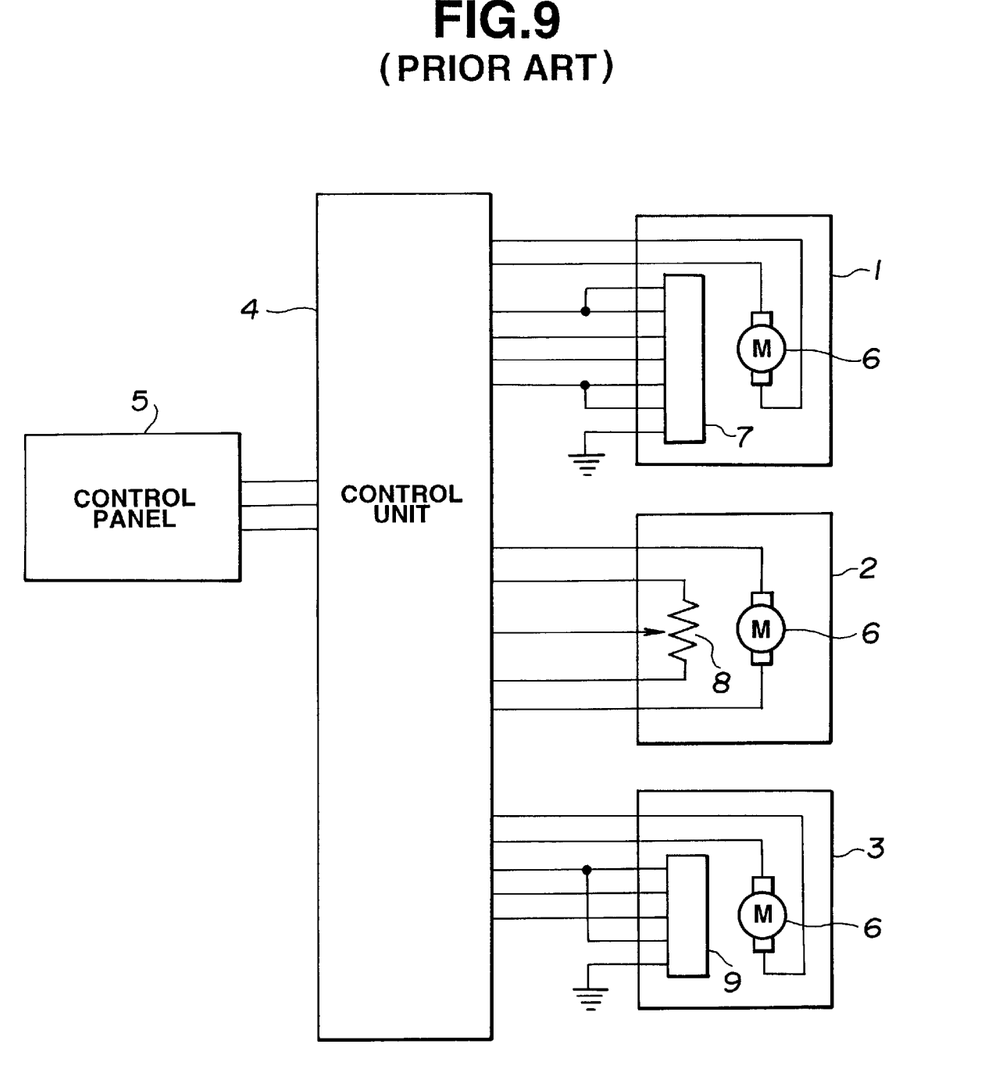
FIG. 9 is a view similar to FIG. 1, but showing a conventional control system of an automotive air conditioning device.

That is, in the conventional control system shown in FIG. 9, twenty one communication wires in total are used between the control unit 4 and the group of the actuators 1, 2, and 3. With usage of these communication wires, a so-called "parallel communication" is carried out for totally controlling the actuators 1, 2, and 3. The control unit 4 has therein a motor drive circuit for issuing a drive signal to the motor 6 of each actuator 1, 2, or 3.

However, usage of such numerous communication wires (that is, twenty one wires in total) and usage of different types of actuators 1, 2, and 3 inevitably induce a complicated and expensive control system and thus of the air conditioning device.

SUMMARY OF THE INVENTION

It is therefore an object of the present invention to provide a control system of an automotive air conditioning device free of the above-mentioned drawbacks.

According to the present invention, there is provided a control system of automotive air conditioning device, which comprises a heater/cooler unit having therein a plurality of control doors by which various air flow modes are provided; a plurality of identical actuators for actuating the control doors, each actuator including an electric motor for driving the corresponding control door, a position detector for issuing a current position signal representative of the current angular position assumed by the corresponding control door, and a control circuit for controlling the electric motor by processing both the current position signal as well as a target position signal applied thereto; and a control unit for totally controlling the actuators by means of a multiplex communication carried out between the control unit and each of the actuators, the control unit issuing the target position signal to each of the actuators.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
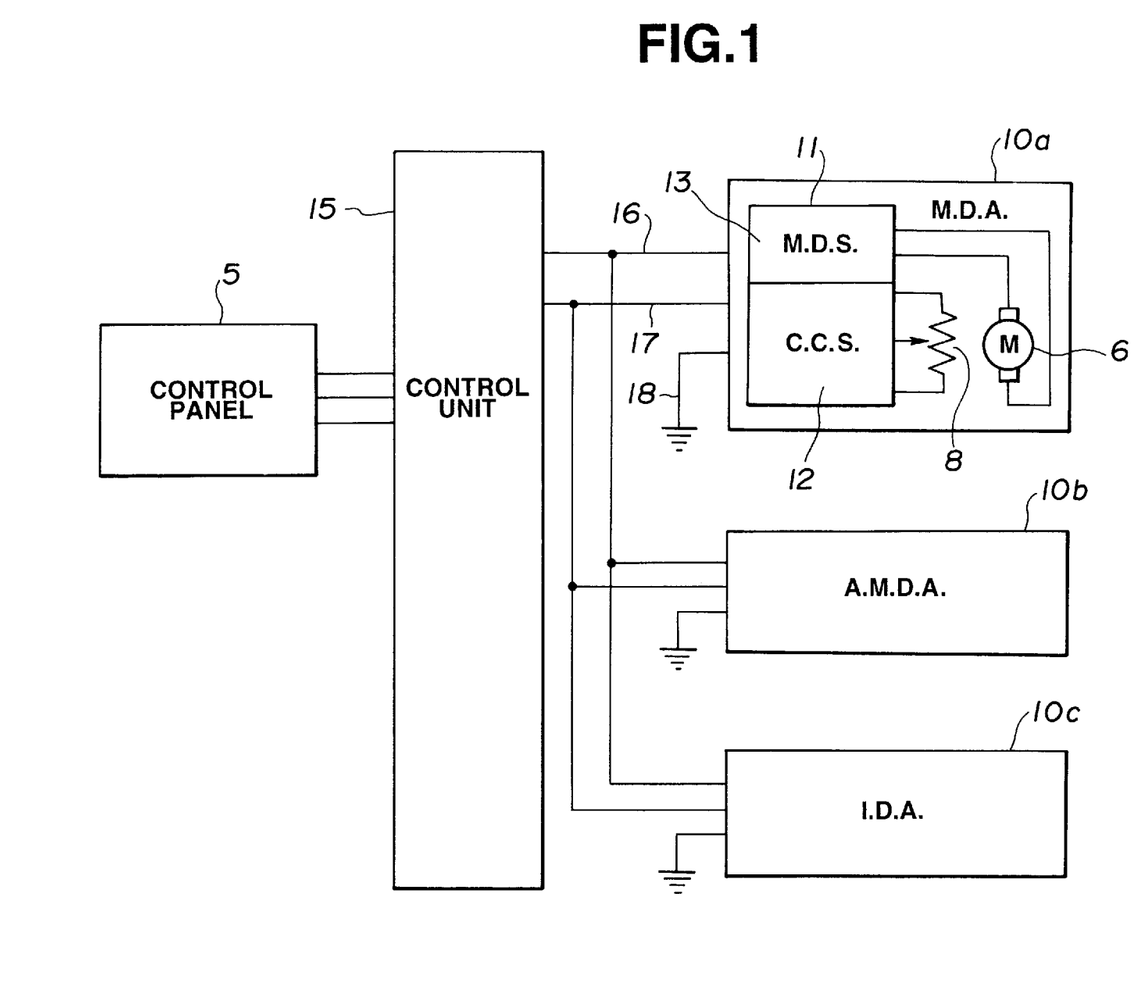
FIG. 1 is a schematic view of a control system of an automotive air conditioning device, which is one embodiment of the present invention.
Figure 2:
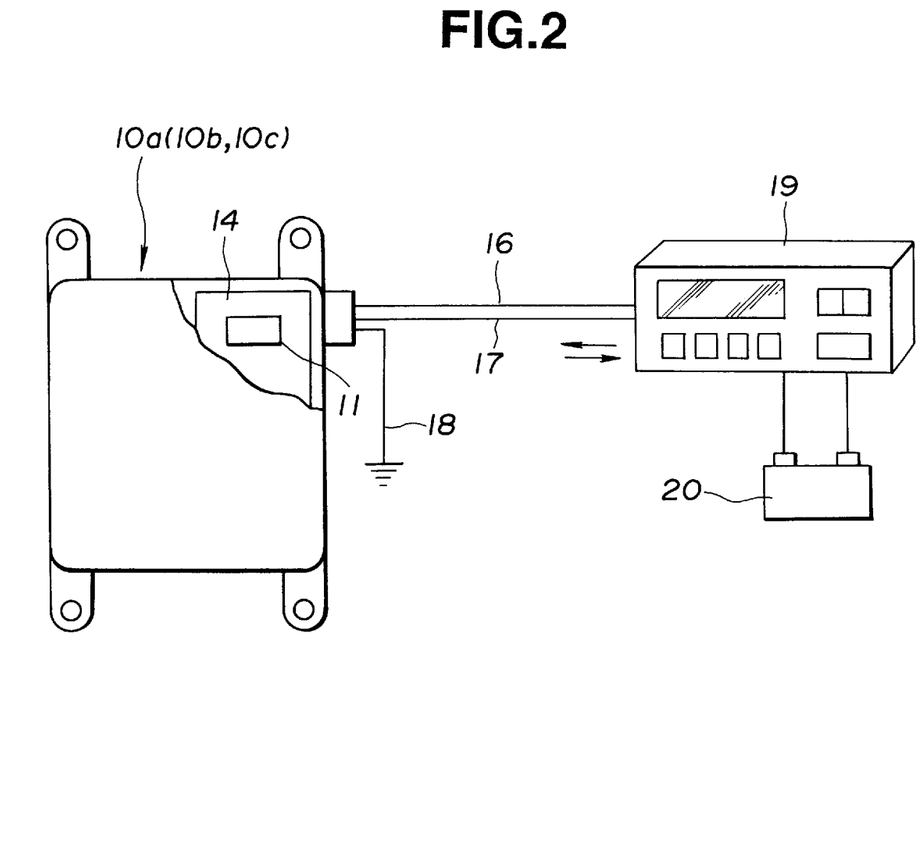
FIG. 2 is a schematic view of the control system of the invention.

Referring to FIGS. 1 and 2, particularly FIG. 1, there is shown a control system of an automotive air conditioning device, which is an embodiment of the present invention.

In FIG. 1, denoted by numerals 10, 10b, and 10c are a mode door actuator, an air mix door actuator and an intake door actuator, which actuates a mode door, an air mix door and an intake door, respectively. These doors are arranged in a heater/cooler unit of the air conditioning device. More specifically, the mode door and the air mix door are installed in a heater/cooler section of the unit and the intake door is installed in an air intake section of the same. The mode door functions to provide various air blowing modes, the air mix door functions to vary the rate between the amount of cooled air and that of heated air led to an air mix chamber provided at a downstream end of the heater/cooler section. The intake door functions to vary the rate between the amount of outside air and that of inside air drawn by an electric fan installed in the air intake section.

It is to be noted that in the present invention, the three actuators 10a, 10b, and 10c are of the same type. That is, the actuators 10a, 10b, and 10c are of a so-called "PBR" type actuator, which comprises an electric motor 6 that drives the corresponding control door and a potentio-balance-resistor (PBR) 8 that serves as a door position detector. As described hereinabove, the PBR type detector 8 outputs a voltage signal whose magnitude represents the current angular position of the corresponding control door. Each actuator 10a, 10b, or 10c has an integrated circuit (IC) 11 installed therein.

The integrated circuit 11 is arranged to have three functions, which are a first function to communicate with an external element, a second function to produce a control signal for the electric motor 6 and a third function to produce a drive signal for the electric motor 6. The integrated circuit 11 comprises a communication control section 12 and a motor drive section 13. The communication control section 12 is connected to the PBR type position detector 8 and has both the first and second functions. The motor drive section 13 is connected to the motor 6 and has the third function, driving the motor 6 in accordance with the control signal issued from the communication control section 12. As shown in FIG. 2, the integrated circuit 11 of each actuator 10a, 10b, or 10c is mounted on a circuit board 14.

The three actuators 10a, 10b, and 10c are totally controlled by the control unit 15 which has a micro-computer installed therein.

The actuators 10a, 10b, and 10c are connected to the control unit 15 through one power wire 16 and one communication wire 17. More specifically, from the control unit 15, there extend only two wires 16 and 17, which are connected to the three actuators 10a, 10b, and 10c in a parallel manner. Each actuator 10a, 10b, or 10c has an earth (ground) wire 18 connected to the ground. Thus, each actuator 10a, 10b, or 10c has one power wire 16, one communication wire 17, and one earth wire 18. That is, the number of the wires employed between the control unit 15 and the three actuators 10a, 10b, and 10c is only nine, which is quite small as compared with that (viz., twenty one) of the wires employed in the above-mentioned conventional control system.

That is, in the control system of the present invention, by using only the communication wire 17, a bi-directional signal flow of communication is carried out between the control unit 15 and each of the actuators 10a, 10b, and 10c. For this communication, a so-called "serial transmission" is used.

A control panel 5 is connected to the control unit 15. The control panel 5 has mounted thereon a plurality of control switches and a plurality of display devices connected to the control unit 15 through wires. As is seen from FIG. 2, the control panel 5 is attached to a housing of a controller 19 where the control unit 15 is installed. Designated by numeral 20 is a battery connected to the controller 19.

Although not shown in the drawings, various sensors are connected to the control unit 15 e.g., an inside air temperature sensor that senses the temperature of the air in the passenger room, an outside air temperature sensor that senses the temperature of the outside air and a solar radiation quantity sensor that senses the quantity of solar radiation supplied to the vehicle. Processing the information signals from the sensors and the control switches, the control unit 15 issues instruction signals to the actuators 10a, 10b, and 10c through the single communication wire 17.

As has been described hereinabove, in the conventional control system of FIG. 9, the motor drive circuit for issuing a drive signal to the motor of each actuator is installed in the control unit 4. While, in the control system of the invention, each of the actuators 10a, 10b, and 10c is equipped with such motor drive circuit 13.

Figure 3:
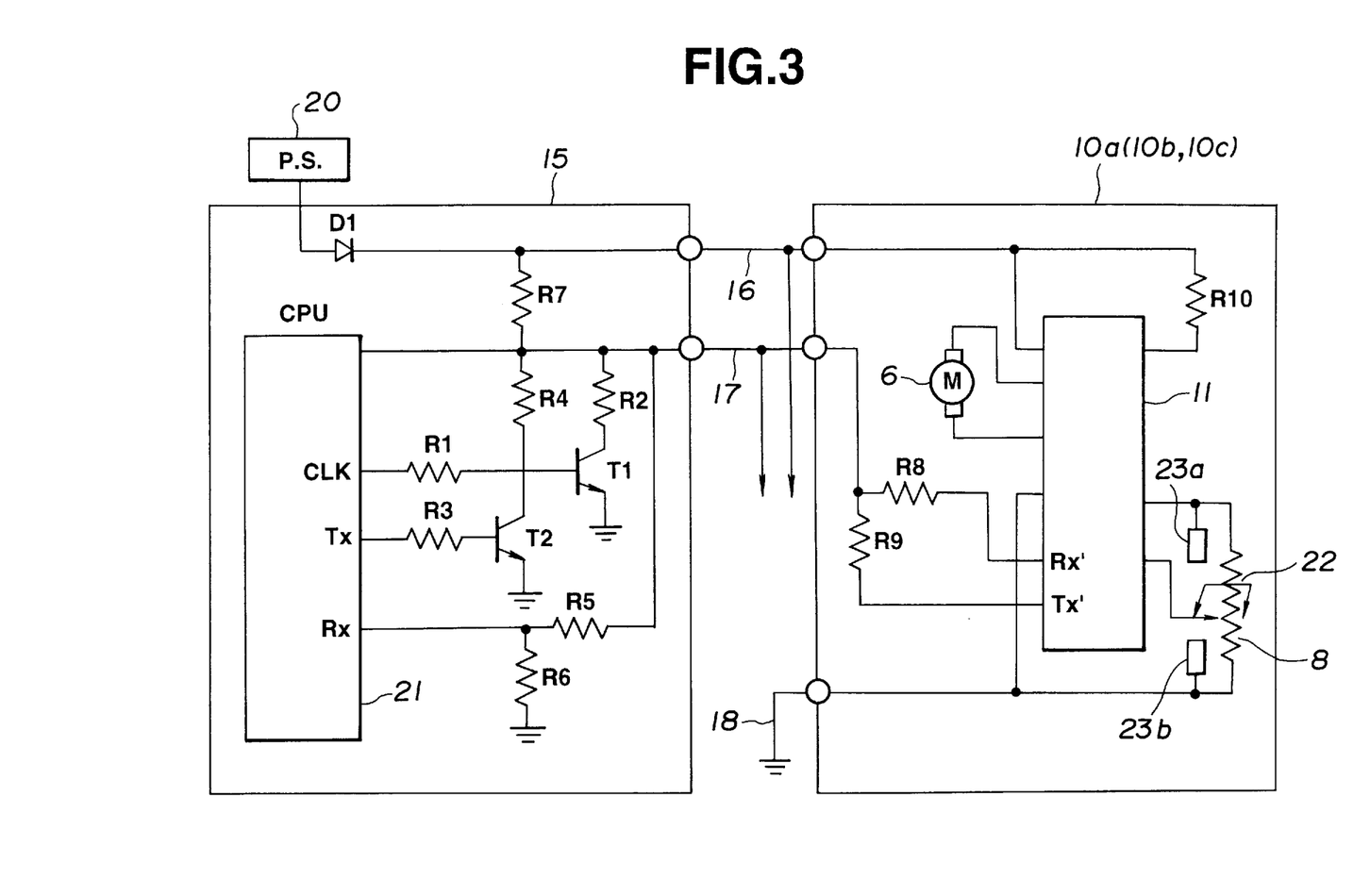
FIG. 3 is a view of an electric circuit employed in the invention.

In FIG. 3, there is shown the detail of the control system of the present invention. For simplification of the drawing, only one actuator 10a is shown.

As shown, the control unit 15 comprises a microcomputer (CPU) 21 provided with a clock terminal (CLK) for outputting a clock signal, a transmission terminal (Tx) for outputting a data signal and a receiving terminal (Rx) for receiving signals from the actuators 10a, 10b, and 10c. As will be described in detail hereinafter, in the present invention, for communicating from the control unit 15 to the actuators 10a, 10b, and 10c, both the clock signal and the data signal travel through the communication wire 17. Between the clock terminal (CLK) and the communication wire 17, there are arranged a resistor R1, a transistor T1 and a resistor R2 in series. Between the transmission terminal (Tx) and the communication wire 17, there are arranged a resistor R3, a transistor T2 and a resistor R4 in series. Between the receiving terminal (Rx) and the communication wire 17, there are arranged a resistor R5 and a resistor R6 in the manner shown. An electric power source 20 is connected through a diode D1 to the control unit 15. That is, the electric power is fed to the CPU 21 through a resistor R7 and to the actuators 10a, 10b, and 10c through the power wire 16.

Each actuator 10a, 10b, or 10c comprises an electric motor 6, a PBR type position sensor 8 and an integrated circuit IC. A receiving terminal Rx' of the integrated circuit IC is connected through a resistor R8 to the communication wire 17. A transmission terminal Tx' of the integrated circuit IC is connected through a resistor R9 to the communication wire 17. Power feeding to the integrated circuit IC is made through the power wire 16. Designated by R10 is a protection resistor. The motor 6 is connected to certain terminals of the integrated circuit IC. An earth terminal of the integrated circuit IC is grounded through an earth line 18. One terminal of the position sensor 8 is connected to a power terminal (5V, for example) of the integrated circuit IC, and the other terminal of the position sensor 8 is connected to the earth line 18. Accordingly, the position sensor 8 outputs a voltage ranging from 0V to 5V. The current position of the control door is represented by the voltage output from the position sensor 8 in accordance with the displacement of a slider 22 of the position sensor 8. The slider 22 is moved in accordance with the pivotal movement of the control door. The voltage signal from the position sensor 8 is fed to a given terminal of the integrated circuit 11.

In the present invention, a patterned resistor part of the PBR type position sensor 8 is printed on the circuit board 14, and the slider 22 slides on the resistor part. The position sensor 8 of this type is simple in construction.

The patterned resistor part of the position sensor 8 is formed at both sides of the slider 22 with two stopper sections 23a and 23b. One stopper section 23a is connected to the power terminal (5V), and the other stopper section 23b is connected to the earth line 18. That is, when, due to trouble of the integral circuit 11 or the like, the slider 22 comes to an extreme position where the slider 22 contacts the stopper section 23a or 23b, the electric motor 6 is enforcedly stopped.

Figure 4:
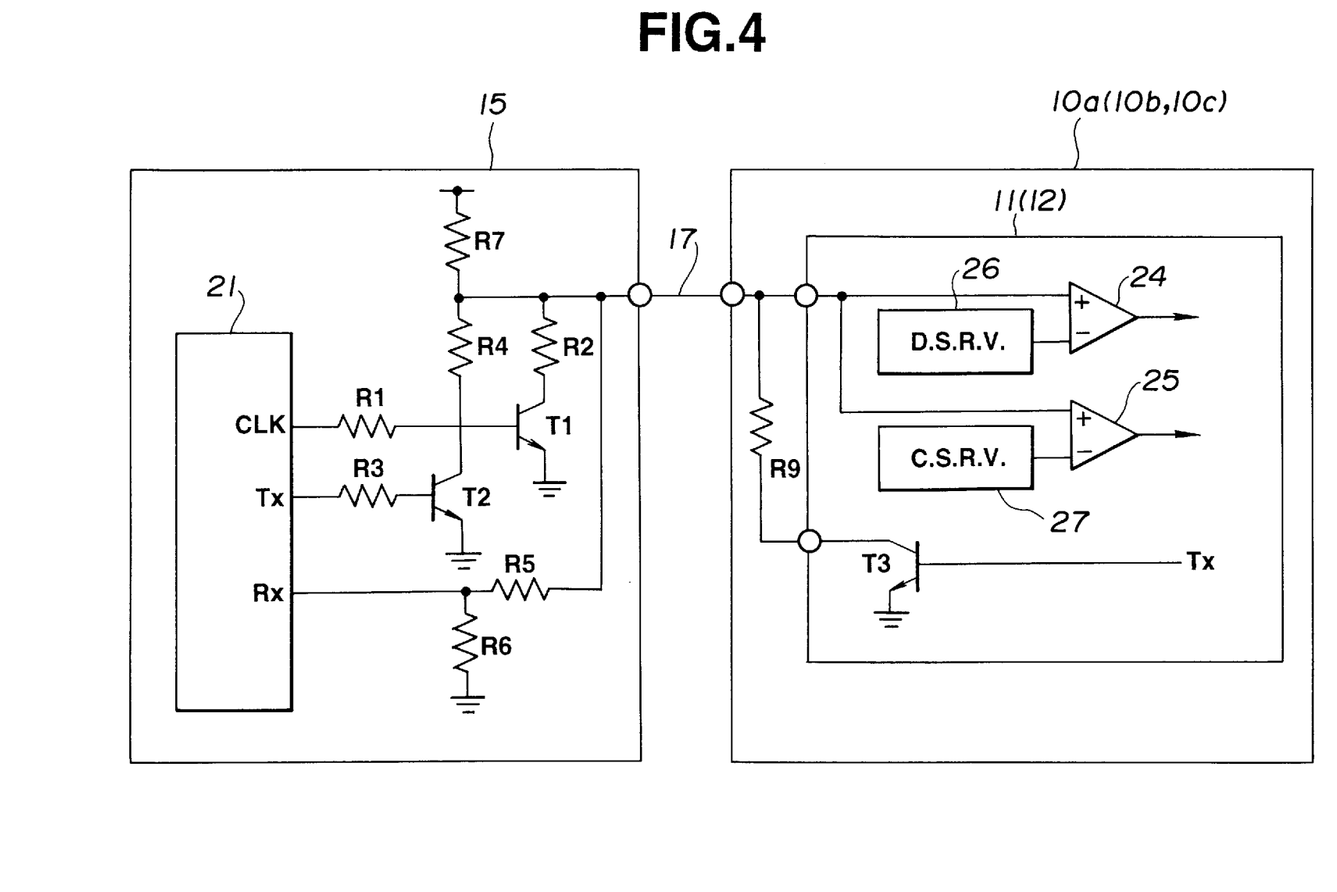
FIG. 4 is a view of the electric circuit of FIG. 3 with some parts removed.

In the following, the communication carried out in the control system will be described with reference to FIG. 4.

As described hereinabove, for the communication from the control unit 15 to the actuators 10a, 10b, and 10c, both the clock signal and the data signal are transmitted simultaneously through the communication wire 17. As shown, the communication control section 12 of the integrated circuit 11 of each actuator 10a, 10b, or 10c comprises a first comparator 24, a second comparator 25, and a transistor T3. That is, the first comparator 24 has a positive input terminal into which the data signal is fed and a negative input terminal into which a reference signal having a threshold value is fed. The reference signal is issued from a memory 26. The second comparator 25 has a positive input terminal into which the clock signal is fed and a negative input terminal into which a reference signal having a threshold value is fed. The reference signal is issued from a memory 27.

Figure 5A:
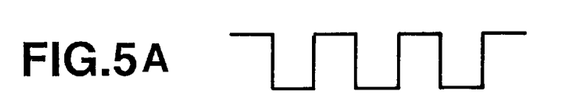
FIGS. 5A, 5B, 5C, 5D and 5E are views of waveforms of various signals carried by a multiplex communication signal used in the invention.
Figure 5B:
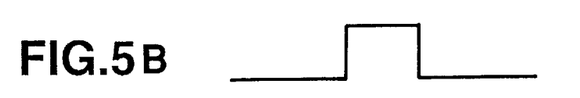
Figure 5C:
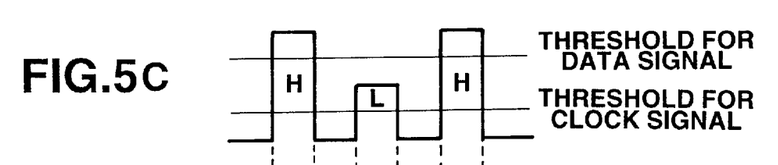
Figure 5D:
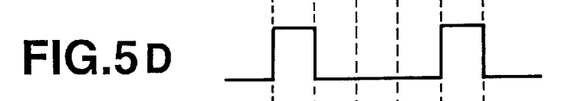
Figure 5E:
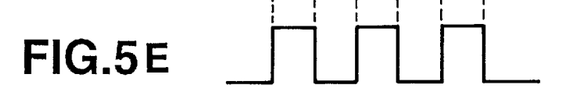

In case wherein the data is transmitted from the control unit 15 to each actuator 10a, 10b, or 10c, the clock signal (see FIG. 5A) from the clock terminal (CLK) of the CPU 21 and the data signal (see FIG. 5B) from the transmission terminal (Tx) of the CPU 21 are composed to produce a multiplex communication signal (see FIG. 5C). The multiplex communication signal is led through the communication wire 17 to the communication control section 12 of the integrated circuit 11 of each actuator 10a, 10b, or 10c. As seen from FIG. 5C, the multiplex communication signal is constructed to express three conditions (viz., high (H), low (L) and off) by the height of pulses. In the high condition (H), both the data signal and the clock signal are included, while in the low condition (L), only the clock signal is included. Accordingly, if the threshold value for the first comparator 24 is set to have an intermediate value between respective values of the high condition (H) and the low condition (L) and the threshold value for the second comparator 25 is set to have an intermediate value between respective values of the low condition and the off condition, the multiplex communication signal from the control unit 15 can be decomposed to the data signal and the clock signal at the first and second comparators 24 and 25, respectively. That is, as understood from FIG. 5(C), at the first comparator 24, the communication signal from the control unit 15 is compared with the data threshold value, while at the second comparator 25, the communication signal from the control unit 15 is compared with the clock threshold value. When the value of the communication signal is higher than the data threshold value, the first comparator 24 issues an ON signal representing the data signal (see FIG. 5(D)). When the value of the communication signal is higher than the clock threshold value, the second comparator 25 issues an ON signal representing the clock signal (see FIG. 5(E)). Similarly, the clock data from the control unit 15 is fed to each of the actuators 10a, 10b, and 10c.

Thus, in the invention, there is no need to provide the signal receiving side (viz., the actuators 10a, 10b, and 10c) with signal transmitting means. That is, in the invention, a so-called "self-synchronized communication" is established. Each actuator 10a, 10b, or 10c is controlled by the clock signal decomposed from the communication signal.

As described hereinabove, in the present invention, for communicating between the control unit 15 and each actuator 10a, 10b, or 10c, the multiplex communication signal is employed. This means, according to the invention, only one communication wire 17 is needed for such communication.

Although the communication signal is constructed to have two types of pulses, high (H) and (L) types, as mentioned before, according to the invention, three subsequent pulses are used for expressing binary data of two bits, for coding the data. That is, if the pulses are HHL pulses, "SOM" is expressed. If HHH pulses, "00" is expressed, if HLH pulses, "01" is expressed, if HHL pulses, "10" is expressed, and if HLL pulses, "11" is expressed.

Figure 6:
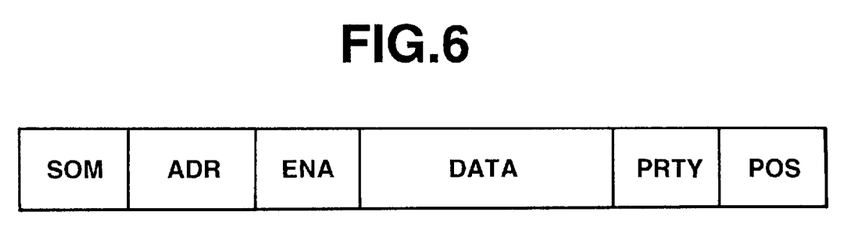
FIG. 6 is a view showing the construction of the multiplex communication signal.

The serial signal used in the multiplex communication has such a construction as shown in FIG. 6. Designated by "SOM" (Start of Message) is a part using 8/3 bits, which represents the starting of transmission. Designated by "ADR" (Address) is a part using 3 bits, which represents the address of each actuator 10a, 10b, or 10c. That is, since, in the invention, the common instruction signals from the control unit 15 are applied to all of the actuators 10a, 10b, and 10c at the same time, such ADR part is employed for distinguishing the instruction signals. Designated by "ENA" (Enable) is a part using 1 bit, which represents whether the motor 6 should be energized or not. With this part, the motor 6 can be enforcedly stopped in an abnormal condition. Designated by "DATA" (Data) is a part using 7 bits, which represents various information for controlling the actuators 10a, 10b, and 10c, i.e., target angular positions of the corresponding control doors. Designated by "PRTY" (Parity) using 1 bit, which represents odd parity for "SDR", "ENA" and "DATA". That is, when odd, it is judged that the communication of "ADR", "ENA" and "DATA" is normal, while, when even, it is judged that the communication of the same is abnormal. The above-mentioned parts "SOM", "ADR", "ENA", "DATA" and "PRTY" are of the information fed to each actuator 10a, 10b, or 10c from the control unit 15. Designated by "POS" (Motor position) is a part using 1 bit, which is to be transmitted to the control unit 15 from the actuators 10a, 10b, and 10c. That is, the "POS" part represents when the corresponding control door has assumed the target angular position or not.

That is, the communication signal traveling through the communication wire 17 comprises the "ADR", "ENA", "DATA", and "PRTY" parts, which are transmitted from the control unit 15 to the actuators 10a, 10b, and 10c, and the "POS" part which is transmitted from the actuators 10a, 10b, and 10c to the control unit 15.

Upon receiving the data from the control unit 15, each actuator 10a, 10b, or 10c operates the corresponding electric motor 6 with an aid of an electric circuit, which will be described in the following.

Figure 7:
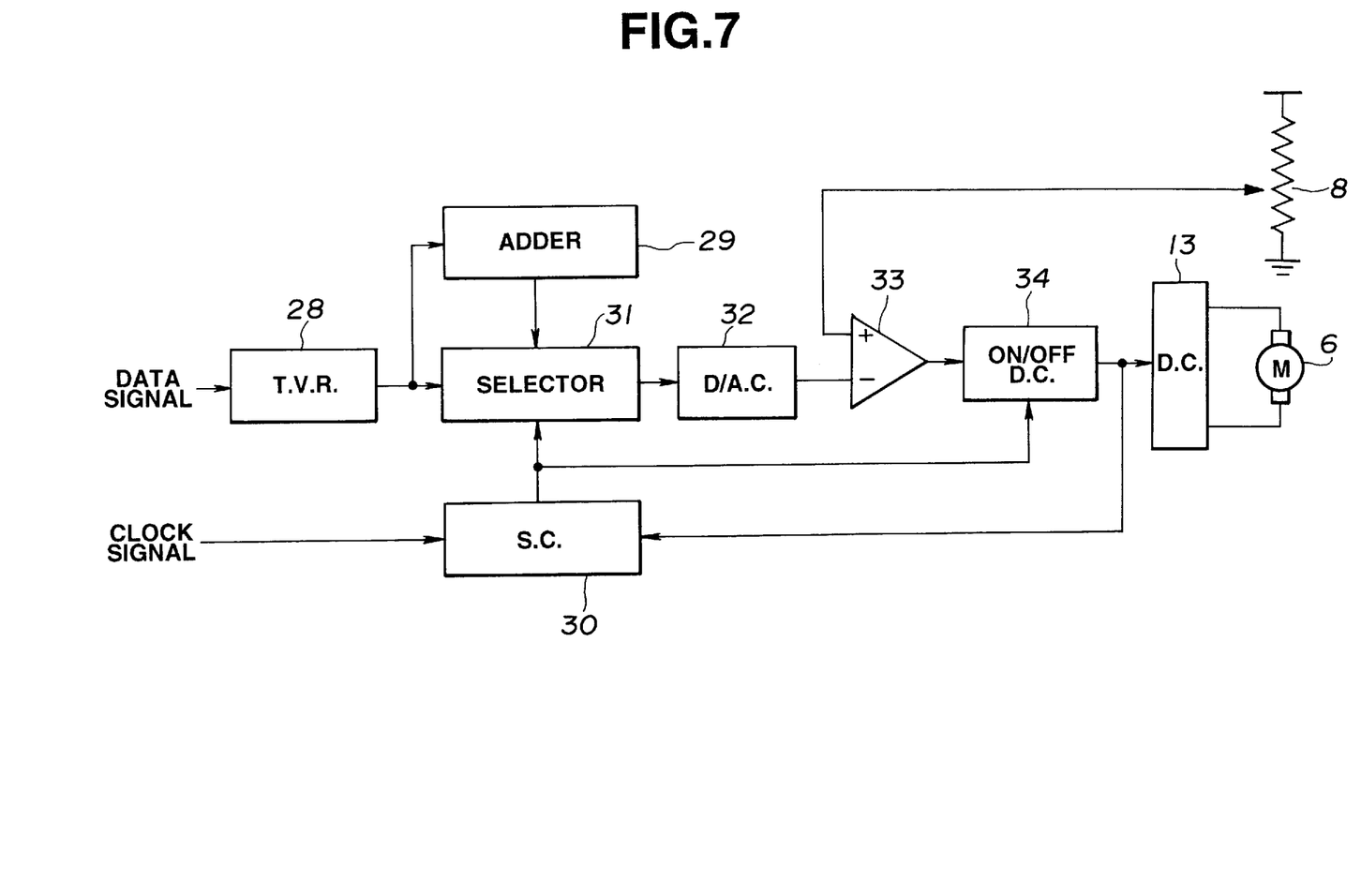
FIG. 7 is a block diagram of a control circuit that controls the electric motor in each actuator.

FIG. 7 shows a detailed view of the electric circuit that practically controls the electric motor 6 by processing the outputs (viz., data signal and clock signal) from the first and second comparators 24 and 25.

As shown in the drawing, the circuit comprises a target value resistor 28, which temporarily stores a digital data of the target angular position (target value) of the control door. The data is included in the data signal from the first comparator 24. The output of the resistor 28 is fed to an adder 29 where 2 (two) is added to the target value. The clock signal from the second comparator 25 is fed to a switching circuit 30, which has two types of outputs alternatively changed. Outputs from the resistor 28, the adder 29 and the switching circuit 30 are fed to a selector 31. That is, in accordance with the type of output from the switching circuit 30, the selector 31 selects either the output from the resistor 28 or the output from the adder 29, that is, the output (from the resistor 28) representing the target value signal (lower limit value signal) and the output (from the adder 29) representing a somewhat higher target value signal (viz., upper limit value signal) provided by adding 2 (two) to the target value. Output of the selector 31 is fed to a D/A converter 32, which converts the digital data of the output from the selector 31 to a corresponding analog data. Output from the D/A converter 32 and output from the position sensor 8 are fed to negative and positive terminals of a third comparator 33 respectively. Output from the third comparator 33 and the output from the switching circuit 30 are fed to an ON/OFF circuit 34, which, based on the information possessed by the outputs fed thereto, decides whether the electric motor 6 should run in a normal direction, reverse direction or be stopped. Output from the ON/OFF circuit 34 is fed to a motor drive circuit 13, which, based on the decision by the ON/OFF circuit 34, controls the electric motor 6.

In general, in the PBR type position sensor 8, longitudinal end portions (about 5% in length) of the resistor part have a weak detecting accuracy. That is, in that area, the linearity is lowered. In view of this, such end portions are not used for detecting the position of the control door and the D/A converter 32 is arranged to output a voltage ranging from 0.05 V to 4.95 V. The target value of the angular position of the control door is represented by 7 bits (the range from 0.05 V to 4.95 V is divided by 128).

As described hereinabove, in accordance with the clock signal switched by the switching circuit 30, the selector 31 feeds the D/A converter 32 with either the lower limit value signal from the resistor 28 or the upper limit value signal from the adder 29 thereby to operate the electric motor 6 to run in a normal direction, a reversed direction or stop. In practice, the control door is controlled to take a position between an angular position determined by the lower limit value signal and an angular position determined by the upper limit value signal. Thus, the most desirable angular position of the control door is determined by an intermediate value between the lower limit value and the upper limit value, which is provided by adding 1 (one) to the target value issued from the resistor 28.

Figure 8:
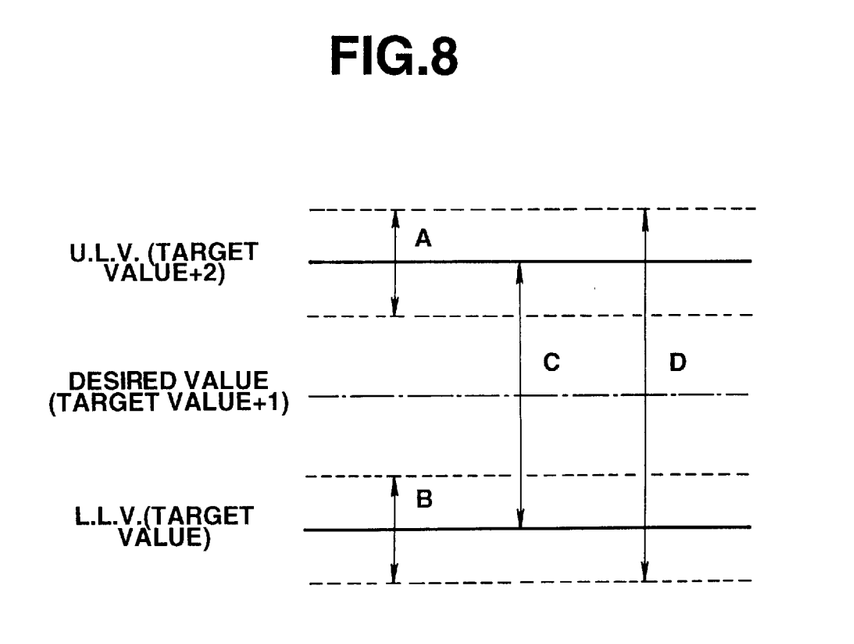
FIG. 8 is a table showing the relationship between the output of a D/A converter and a motor stopping range.

FIG. 8 shows the relationship between the dispersion of the output of the D/A converter 32 and the range (viz., motor stopping range) within which the electric motor 6 is stopped.

The control achieved by using one D/A converter 32 and one comparator 33 makes the control error very small. The reason for this will be explained in the following with respect to the accuracy of the D/A converter 32, that is, with respect to respective dispersions "A" and "B" of the upper and lower limit values. Because the upper and lower limit values are output by the single D/A converter 32, they are not scattered separately and thus the relative dispersion therebetween is very small. That, the upper and lower limit values are allowed to have certain but substantially equal errors keeping the difference therebetween constant. This means that the dispersion of the motor stopping range is very small, and thus, undesired hunting phenomenon of the motor 6 is prevented with a much narrower motor stopping range "C". As a result, the door stop positioning accuracy "D" is improved. Preparation of both the upper and lower limit values by only the adder 29 induces a simple and thus an inexpensive electric circuit.

In the following, advantages of the invention will be described.

In the present invention, the actuators 10a, 10b, and 10c are of the PBR type motor actuator having an electric motor installed therein, the electric connection between the control unit 15 and each actuator 10a, 10b, or 10c is achieved by only the power wire 16 and the communication wire 17, and the control of each actuator 10a, 10b, or 10c is carried out by using the multiplex communication on the communication wire 17. Thus, the number of wires needed for electrically connecting the control unit 15 and each actuator 10a, 10b, or 10c is greatly reduced as compared with the case of the above-mentioned conventional control system of FIG. 9. That is, according to the invention, only two wires are needed. While, in the conventional one, twenty one wires are needed.

Since the three actuators 10a, 10b, and 10c are all the same, the control system is simple in construction and low in cost. That is, in the invention, there is no need of using different types of actuators.

Unlike in the case of the conventional control system, the motor driving control in the invention is effected by each actuator 10a, 10b, or 10c, which has the integrated circuit 11 installed therein. Thus, the load of the micro-computer 21 of the control unit 15 is lowered inducing simplification of the logic for controlling each actuator 10a, 10b, or 10c. Thus, the control system of the invention can be operated with a simple and thus an inexpensive software.

Because of simplification of each actuator 10a, 10b, or 10c, the control unit 15 can be made compact in size. This brings about an easy integration of the control unit 15 with the control panel 5 and/or the actuators 10a, 10b, and 10c.

Due to usage of the actuators 10a, 10b, and 10c all of which are of the PBR type position sensor, development of auxiliary equipment is easy.

Although the above-description is directed to the example wherein three actuators 10a, 10b, and 10c are controlled by the control unit 15, at most 8 (eight) actuators can be controlled by the control unit 15 provided that the ADR part of the serial signal used in the multiplex communication has 3 bits.

What is claimed is:

1. A control system of automotive air conditioning device, comprising:

a heater/cooler unit having therein a plurality of control doors by which various air flow modes are provided;

a plurality of identical actuators for actuating the control doors, each actuator including an electric motor for driving the corresponding control door, a position detector for issuing a current position signal representative of the current angular position assumed by the corresponding control door, and a control circuit for controlling said electric motor by processing both said current position signal and a target position signal applied thereto; and a control unit for totally controlling said actuators by means of a multiplex communication carried out between said control unit and each of the said actuators, said control unit issuing said target position signal to each of said actuators, wherein the multiplex communication means uses a serial signal having an address part for distinguishing instruction signals applied to the control circuit of said actuators.

2. A control system as claimed in claim 1, wherein said multiplex communication means uses a single communication wire through which all of said actuators are electrically connected to said control unit.

3. A control system as claimed in claim 2, wherein said position detector is of a variable resistor arranged to output a voltage whose magnitude is varied in accordance with the angular position of the control door.

4. A control system as claimed in claim 2, wherein the single communication wire simultaneously transmits a clock signal and a data signal.

5. A control system as claimed in claim 1, wherein the control circuit of each actuator comprises:

a communication control section for receiving the serial signal from said control unit and for extracting said target position signal from the serial signal;

a judging section for judging whether the electric motor should be run in a normal direction, reverse direction, or be stopped based on the outputs from said communication control section and said position detector; and     a motor drive section for controlling said electric motor based on the output from said judging section.

6. A control system as claimed in claim 5, wherein each of the control circuit of each actuator comprises an integral circuit.

* * * * *